No. 694,326. Patented Feb. 25, 1902.
J. D. PRESCOTT.
CLAMPING DEVICE FOR VEHICLE WHEEL TIRES.
(Application filed Dec. 20, 1900. Renewed Aug. 1, 1901.)
(No Model.)

Witnesses:

Inventor
Joseph D. Prescott
By James L. Norris
Atty.

UNITED STATES PATENT OFFICE.

JOSEPH D. PRESCOTT, OF BOSTON, MASSACHUSETTS, ASSIGNOR OF TWO-THIRDS TO CHARLES N. BACON, OF WINCHESTER, MASSACHUSETTS, AND ALBERT W. GRIFFITH, OF BEACHMONT, MASSACHUSETTS.

CLAMPING DEVICE FOR VEHICLE-WHEEL TIRES.

SPECIFICATION forming part of Letters Patent No. 694,326, dated February 25, 1902.

Application filed December 20, 1900. Renewed August 1, 1901. Serial No. 70,567. (No model.)

*To all whom it may concern:*

Be it known that I, JOSEPH D. PRESCOTT, a citizen of the United States, residing at Boston, in the county of Suffolk and State of Massachusetts, have invented new and useful Improvements in Clamping Devices for Vehicle-Wheel Tires, of which the following is a specification.

This invention relates to certain new and useful improvements in clamping devices for vehicle-wheel tires, and is particularly adapted for securing the tire in two or more sections to the vehicle-wheel, so that if a section has been damaged or injured by any cause it can be removed, a duplicate section replaced, thus overcoming the removal of the entire tire, as well as doing away with the same; and to this end the object of the invention is to enable the securing of a tire in two or more sections of any shape desired to a vehicle-wheel and to prevent the doing away with the entire tire when only a section thereof is damaged or injured.

A further object of the invention is to provide a clamping device for vehicle-wheel tires which shall be extremely simple in its construction, strong, durable, and efficient in use, comparatively inexpensive to manufacture, and consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1:
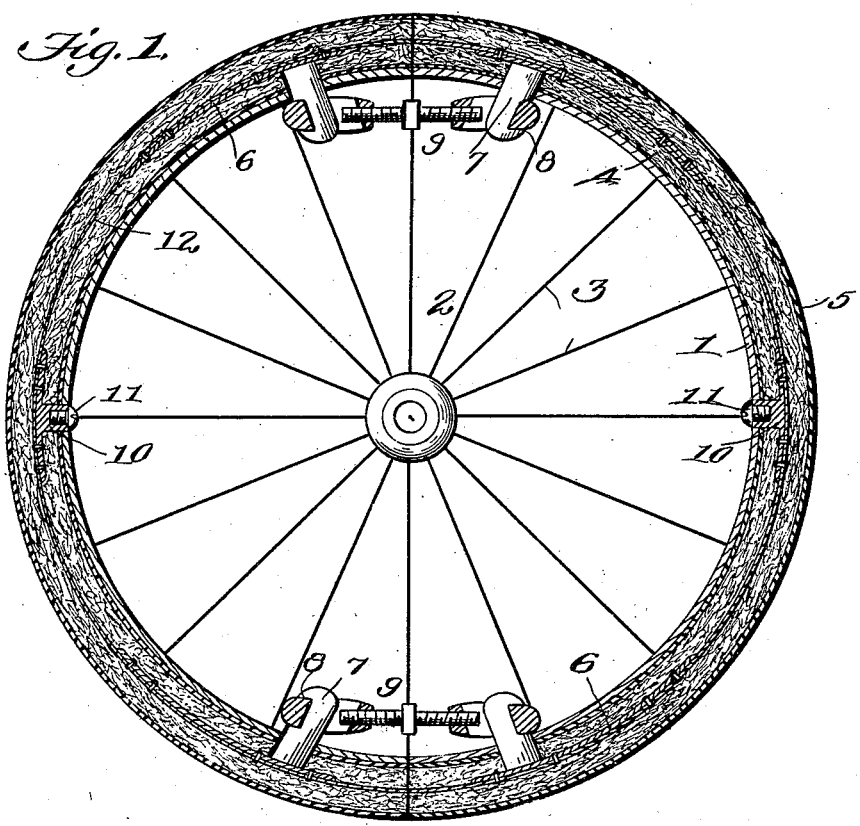
Figure 2:
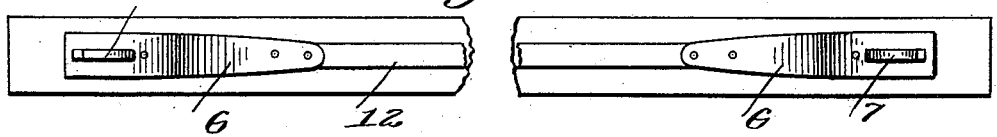
Figure 3:
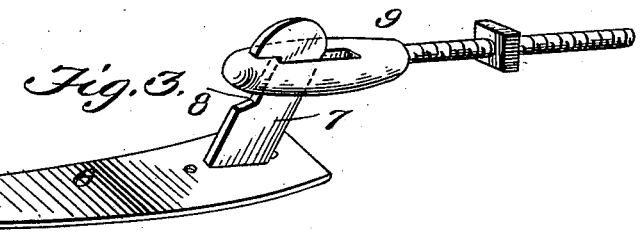
Figure 4:
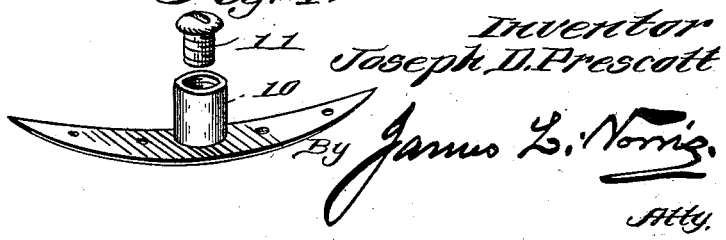

Figure 1 is a side sectional elevation of a wheel, showing the tire secured thereto in sections by my improved means. Fig. 2 is a top plan view of one section of the core of the tire broken, showing the clamping device in position. Fig. 3 is a perspective view of one of the members of the clamp with turnbuckle attached thereto. Fig. 4 is a perspective view of the socket and fastening-pin.

Referring to the drawings by reference-numerals, 1 indicates the felly of the wheel; 2, the spokes; 3, the core or inner section of the tire, which is formed of two or more sections; 4, the outer section of the tire, which is also formed of two or more sections, and 5 a covering of vulcanized rubber.

The tire may be formed of any desirable material, and the inner and outer sections when in position may be cemented or sewed together, after which the rubber is placed upon the outside of the tire and then suitably vulcanized. The shape of the tire may be round, square, quadrangular, octangular, or any desired shape, and the inner and outer sections may be divided into as many sections or parts as may be desirable to suit the vehicle on which they are placed.

The clamping device for securing the sections of the tire together as well as to the felly 1 of the wheel consists of a pair of separate curvilinear supporting-plates 6, each of which may conform to the outer face of the core or inner section 3. A pair of the plates 6 are secured to each of the parts of the section 3 and are provided at one end with an arm 7, depending therefrom at an inclination, each having formed in their outer side a notch or seat 8 to receive one end of the fastening or turnbuckle 9. The arms 7 of the plates of one part of the section 3 are adapted to extend toward the arms 7 of the plates 6 of the adjacent part of the section 3 as well as projecting entirely through the section 3 and felly 1, so they can be engaged and connected together by the turnbuckle 9, the ends thereof seating in the notches or seat 8.

The reference-numeral 10 denotes a screw-threaded socket or cap, which extends through the section 3 and felly 1 and is adapted to receive the screw-threaded fastening-pin 11. The socket is arranged centrally of one of the parts of the section 3 and is connected by soldering or riveting to the band 12, while the ends of the band 12 are secured in a like manner to the plates 6.

The tire is set up and secured to the wheel in the following manner: To each end of the parts of the section 3 is secured a plate 6, connected together by the band 12, carrying the socket 11, which, as well as the arm 7, projects through the section 3 and felly 1, the fastening-pin is driven home in the socket 10, and the turnbuckle mounted and adjusted upon the arm 7, so as to draw the tire solidly to the felly as well as to draw the ends of the parts of the section 3 together in a solid and a substantial manner. The parts of the section 4 of the tire are then mounted upon the parts of the section 3 and secured thereto in any desirable manner, such as cementing or sewing together. After the sections of the tire are set up in the manner described the rubber covering 5 is placed upon the outside of the tire and vulcanized in any desirable manner, so that nothing will show but the arms 7 and buckle 9, which project toward the axis of the wheel.

By the foregoing construction and arrangement of clamping device for securing a tire in the manner shown to the felly of the wheel a section of the tire when damaged or injured can be readily removed and a corresponding section replaced without having to dispense with the entire tire, and it is thought the many advantages of such a device can be readily understood from the foregoing description, taken in connection with the accompanying drawings, and it will also be noted that various changes may be made in the details of construction without departing from the general spirit of my invention for detachably securing to the felly of a wheel two or more sections of a tire.

Having thus fully described my invention, what I claim is—

1. In a device for connecting the sections of a tire to a wheel, plates secured to the tire and provided with arms extending at an inclination, bands for connecting together the said plates, a socket secured to said band, a fastening-pin operating in said socket, and means for connecting the arms together.

2. In a device for connecting the sections of a tire to a wheel, a plate secured to each end of the said sections, an arm carried by each of said plates, a band connected to each of said plates, means engaging said arms for securing the sections to the wheel, a socket secured to said band, and a fastening means engaging said socket.

3. In a device for connecting the sections of a tire to a wheel, a plate secured to each end of the said sections, an arm carried by each of the said plates, the arms of one section extending toward the arms of the adjacent section, a band engaging each of said sections and connected to the plates thereof, a socket secured to said band, a fastening means engaging said socket and means engaging said arms for connecting the sections together.

4. In a device for connecting the sections of a tire to a wheel, a pair of plates suitably secured to each of the sections, an arm carried by each of the plates, extending through the section and into the wheel, each of said arms provided with a seating, bands connected to said plates, a socket secured to each of said bands and extending through said sections, fastening means engaging in said socket, and an adjustable means engaging in said seatings for connecting the arms together thereby securing the tire to the wheel.

In testimony whereof I have hereunto set my hand in presence of two subscribing witnesses.

JOSEPH D. PRESCOTT.

Witnesses:
CHARLES E. ROGERS,
ALBERT W. GRIFFITH.